Patented Dec. 31, 1929

1,741,973

UNITED STATES PATENT OFFICE

BRUNO BRUHN, OF BETHLEHEM, PENNSYLVANIA, ASSIGNOR TO G. POLYSIUS, OF DESSAU, GERMANY, A FIRM OF GERMANY

PROCESS OF MAKING FUSED CEMENT

No Drawing. Application filed June 9, 1927, Serial No. 197,759, and in Germany September 10, 1924.

This invention relates to the manufacture of cement high in alumina and the main object is to simplify the process of manufacture and reduce the cost.

In the manufacture of cements and particularly of Portland cement, the preliminary treatment of the raw material is a matter of very great importance if a satisfactory cement is to be produced. A very intimate mixture of the materials must be secured in order to satisfy the chemical and physical requirements.

It is customary to crush or pulverize the raw material, thoroughly dry it, and effect an intimate mixing of the ground ingredients.

By means of my invention, I avoid the necessity of fine grinding, drying, and thorough mixing and thus greatly reduce the cost of making the cement as well as shortening the time and simplifying the procedure.

In carrying out my invention, I feed to a rotary kiln, the lumps or pieces of the raw material as they come from the quarry or other source and heat the mixture of such lumps or pieces to the fusing point. Within the kiln the lumps are broken up by impact and attrition due to the rotary action of the kiln. This mechanical breaking and mixing of the lumps while at a high temperature, may be more economically effected than by grinding and mixing while cold. While the lumps are being thus mechanically broken up they are the same time subjected to the fusing temperature so that as the fusing progresses on the surface of the lumps, the fused portions are removed and fresh surfaces are exposed for contact with the other ingredients. Thus the disintegration of the lumps, the mixing of the disintegrated particles, and the fusing of the mixture of particles, take place simultaneously and in a single unit of the apparatus. I thereby avoid the necessity for previous fine grinding and two step operation which has heretofore been the universal practice in cement making. The various ingredients of the mixture by being simultaneously broken mechanically and subject to high heat, unite to produce a homogeneous product of the best quality. The size of the chunks to be used may vary with the physical and chemical character of the raw material and also depends on the size and capacity of the furnace but in any event the material is used in lump or chunk form as distinguished from the usual powder or finely subdivided condition.

The materials employed are such as will produce a cement rich in argillaceous earth and may contain 38 to 40 percent alumina and about 40 percent lime, the balance being made up of iron and silica.

The fused product taken from the rotary kiln or furnace may be ground in the usual manner after cooling.

Having thus described my invention, what I claim as new and desire to secure by Letters Patent is:

1. The process of making a cement having 38% to 40% of alumina, which consists in delivering to a rotary furnace lumps of the unground raw material of the size and character in which said lumps come from the quarry, effecting a homogeneous mixture of the ingredients, rotating said kiln to thereby break up the lumps and mix the particles, and at the same time heating to effect fusion, and thereafter grinding the fused mixture.

2. The process of making cement high in alumina which consists in adding the raw material to a rotary kiln in the form of lumps or chunks, rotating said kiln to thereby break up said lumps or chunks and mix the ingredients, and heating the material to the fusing point during such breaking action.

3. The process of making a cement having 38% to 40% alumina and about 40% lime which consists in adding the raw material to a rotary kiln in the form of lumps or pieces, rotating the kiln to mix and break up the lumps or pieces, heating the material to the fusing point during said rotation of the kiln, and thereafter grinding the fused product.

Signed at Bethlehem, in the county of Northampton and State of Pennsylvania, this seventh day of June A. D. 1927.

BRUNO BRUHN.